July 29, 1952 H. H. WASHBOND 2,604,708
RAISING AND LOWERING MECHANISM FOR BULLDOZERS
Filed July 13, 1946 4 Sheets-Sheet 1
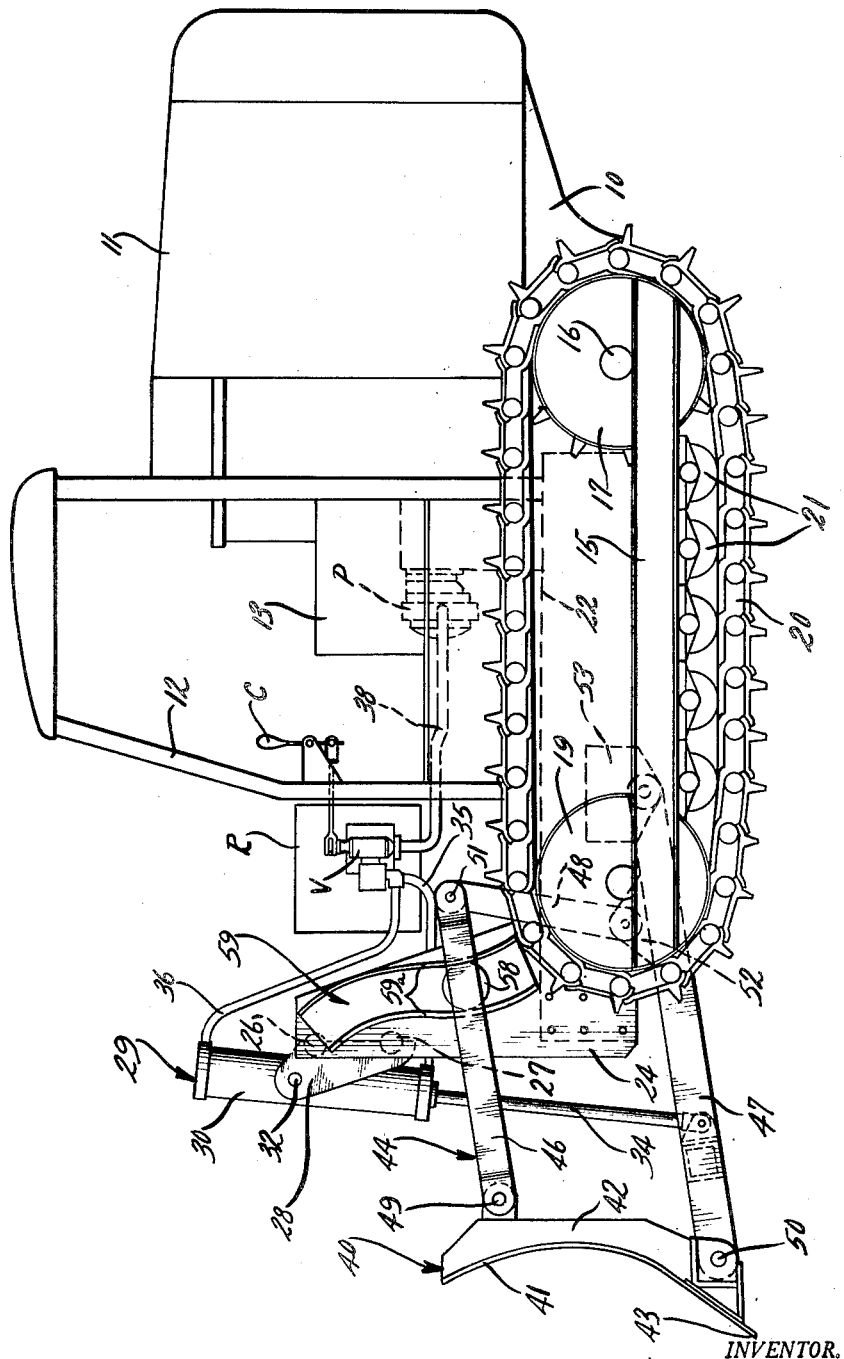
INVENTOR.
HARRY H. WASHBOND
BY
ATTYS.

July 29, 1952  H. H. WASHBOND  2,604,708
RAISING AND LOWERING MECHANISM FOR BULLDOZERS
Filed July 13, 1946  4 Sheets-Sheet 2
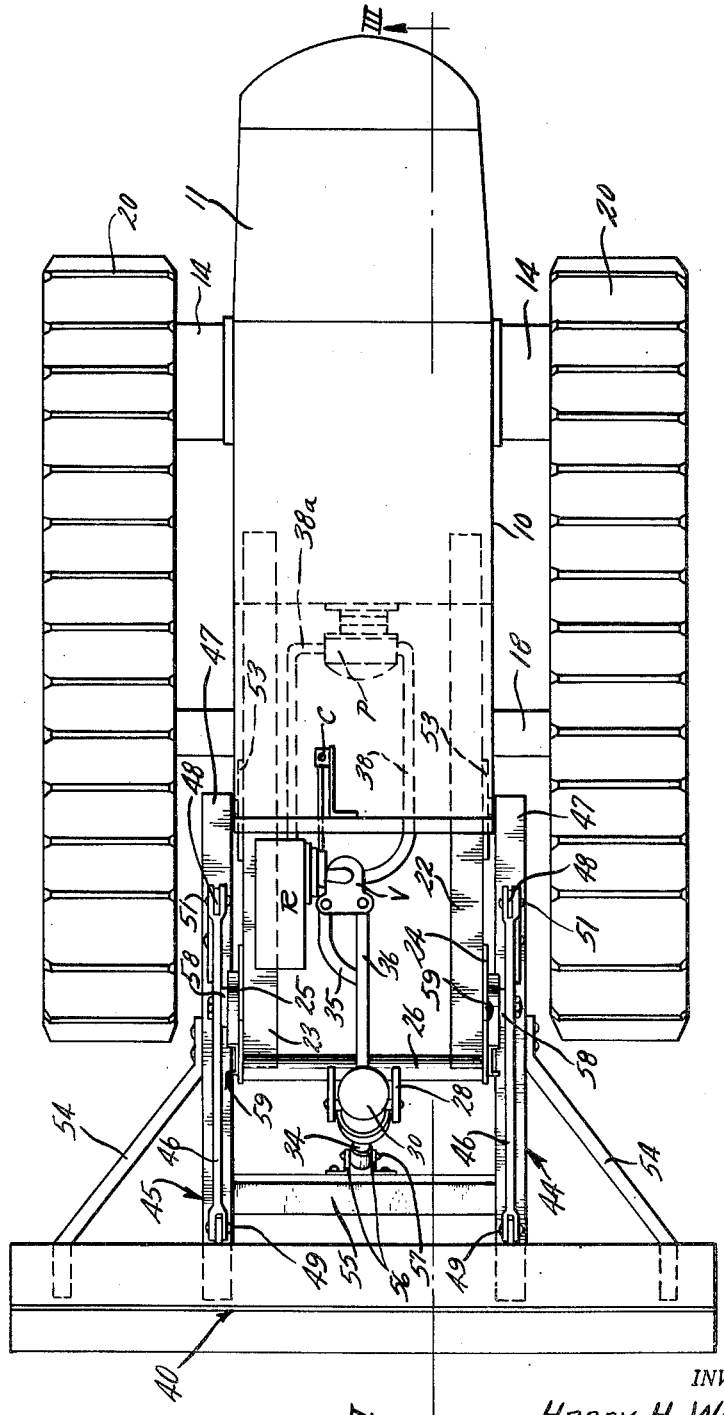
INVENTOR.
HARRY H. WASHBOND
BY
ATTYS.

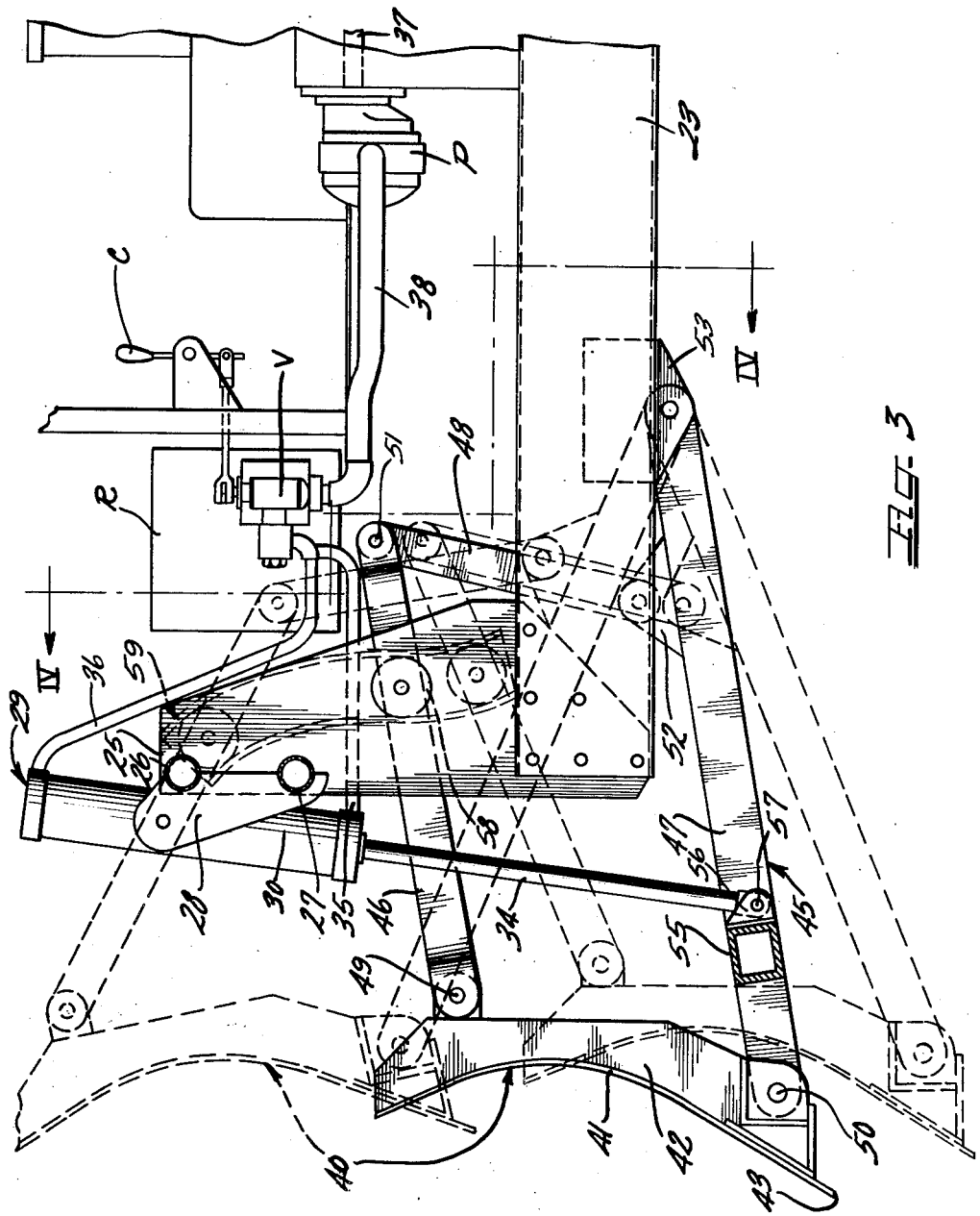

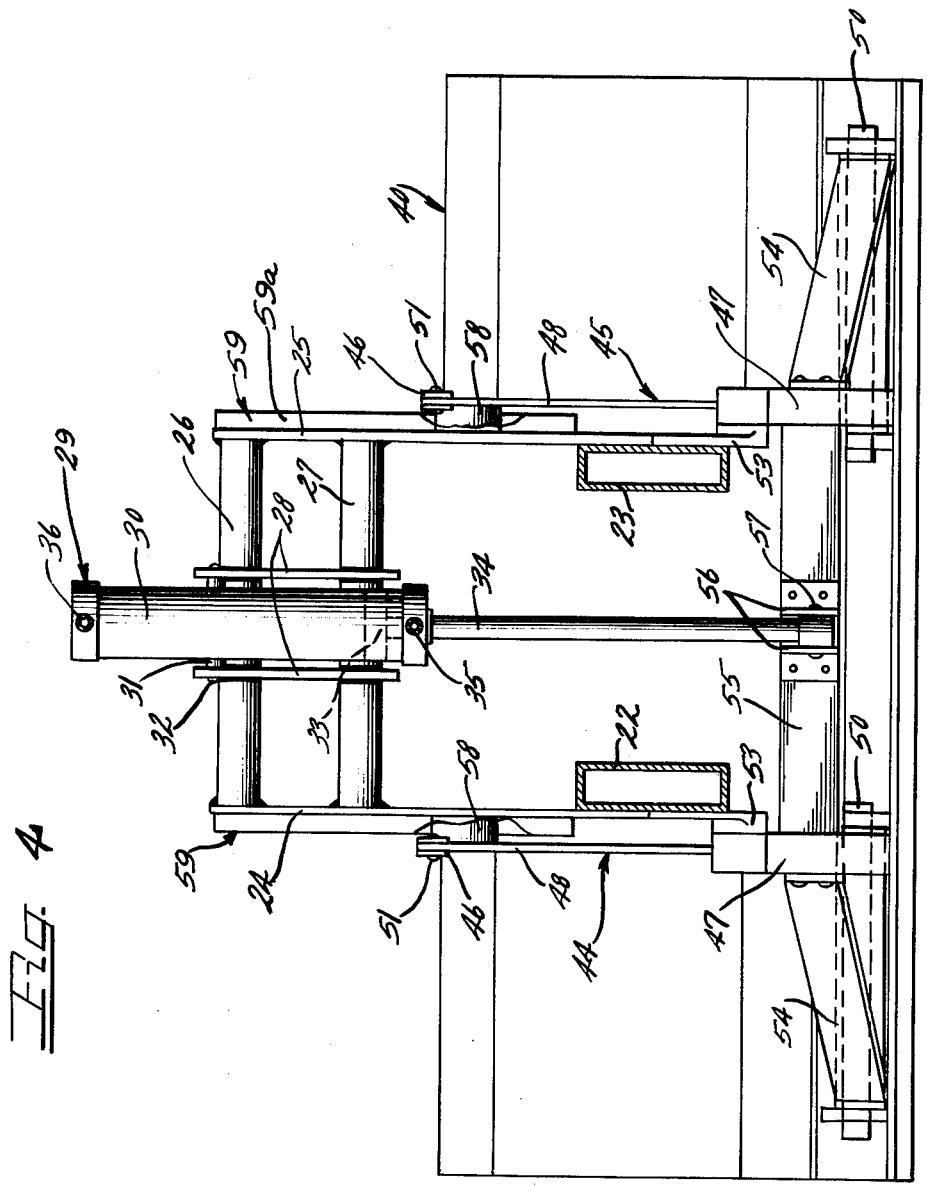

Patented July 29, 1952

2,604,708

UNITED STATES PATENT OFFICE 2,604,708

RAISING AND LOWERING MECHANISM FOR BULLDOZERS

Harry H. Washbond, Springfield, Ill., assignor to The Baker Manufacturing Company, Springfield, Ill., a corporation of Illinois Application July 13, 1946, Serial No. 683,468

1 Claim. (Cl. 37—144)

This invention relates to a bulldozer or scraper structure for attachment to and control from a power vehicle, such as a tractor, wherein the rake angle of the bulldozer blade or scraper blade is controlled along a predetermined path independently of the path of the linkage supporting the blade as this linkage raises and lowers the blade.

Specifically, the invention deals with linkage for the implement blade of earth-working machinery such as bulldozers or the like wherein the rake angle of the blade is controlled by a cam.

This application is a continuation in part of my copending application entitled: "Bulldozer or Scraper Structure," U. S. Serial No. 523,464 filed February 22, 1944, now U. S. Patent No. 2,404,759, dated July 23, 1946.

In my parent application Serial No. 523,464, I have disclosed and claimed a bulldozer structure having a blade support including a pair of linkage quadrilaterals with lower links pivoted to the tractor or other propelling vehicle at their rear ends, and to the lower edge of the blade at their front ends. Upper links are pivoted to the upper edge of the blade at their front ends and are pivoted to inner links at their rear ends. These inner links, in turn, are pivoted on the lower links. The upper ends of the inner links thereby serve as fulcrums for the upper links to control the rake angle of the blade. These fulcrums are shifted by means of control links that are pivoted to the inner links intermediate their ends and are also pivoted to a rigid portion of the tractor, such as a framework on the tractor body. In this construction, as the blade is raised and lowered by means of a hydraulic jack or the like, the control links shift the fulcrums for the upper links to hold the blade face in a substantially vertical position throughout its scraping range.

The present invention now makes possible control of the rake angle of an implement blade on earth-working machinery or the like without limitation caused by fixed pivots for control linkage. In the present invention, linkage quadrilaterals are provided for supporting the implement blade from a power vehicle such as a tractor, in the same manner as described in my parent application. However, the upper links of the linkage quadrilaterals, instead of having shiftable fulcrums controlled by control arms which are anchored on the tractor at fixed pivot points, have cam rollers thereon riding in cam tracks mounted rigidly on the power vehicle. These cam tracks can be of any desired configuration to shift the upper links for changing the rake angle of the blade as the blade is moved. In this arrangement, therefore, any desired rake angle of the blade can be maintained or varied as the blade is raised and lowered. In the illustrated embodiment of the invention, the blade face is held substantially vertical throughout its normal scraping range above and below ground level, and is then tilted forwardly to shed dirt above the scraping range.

It is, then, an object of this invention to provide an improvement for the linkage assembly of my parent application Serial No. 523,464 whereby the rake angle of the implement supported by the linkage assembly is maintained or varied at will.

A further object of the invention is to provide earth-working equipment with an implement blade so supported that its rake angle can be selected for any position of the blade during its range of travel.

Another object of the invention is to provide a bulldozer linkage which controls the rake angle of the bulldozer blade as desired and without limitation.

A specific object of the invention is to provide a bulldozer or scraper assembly wherein the rake angle of the bulldozer blade or scraper blade is controlled by a cam.

Other and further objects of the invention will be apparent to those skilled in the art from the following detailed description of the annexed sheets of drawings which, by way of a preferred example only, illustrate one embodiment of the invention.

As shown in the drawings:

Figure 1 is a side elevational view of a power vehicle equipped with the bulldozer or scraper structure and linkage of this invention.

Figure 2 is a plan view of the machine of Figure 1.

Figure 3 is an enlarged longitudinal vertical cross section taken substantially along the line III—III of Figure 2.

Figure 4 is a transverse vertical cross section taken substantially along the broken line IV—IV of Figure 3.

On the drawings:

The power vehicle to which I have shown my improved bulldozer or scraper assembly applied, is a tractor of the type in which the driving engine is at the rear of the vehicle body and the driver's cab is at the front. It will be understood, of course, that any type of tractor or power vehicle can be used in place of the illustrated tractor. The illustrated tractor has a frame or body 10, at the rear of which is mounted the engine frame 11, and, at the front of which is located the driver's cab 12 having a seat 13 therein. A rear axle housing 14 supports the track frames 15, and transmission means (not shown) within the axle housing is driven by the engine for driving sprockets 17 on shaft structure 16. Forwardly of the rear axle housing, a cross support 18 extends from the vehicle body to the track frames 15, and on the forward ends of the track frames are mounted the idler wheels 19, endless tracks 20 engaging the sprocket wheels and idler wheels at opposite sides of the vehicle. Track rollers 21 on the track frames engage with the lower runs of the tracks 20.

Secured to and extending forwardly from the vehicle body 10 at opposite sides thereof are the beams 22 and 23 which respectively carry, at their forward ends, upstanding rigid plates 24 and 25. The plates 24 and 25 can be secured to the outer faces of the beams by means of rivets, welding, or the like.

Cross tubes 26 and 27 span the upper ends of the plates 24 and 25 in spaced parallel superimposed relationship. These cross tubes are secured to the plates as by welding or the like. A pair of bracket plates 28 are welded to the front faces of the tubes 26 and 27 at the central portions of the tubes and project forwardly from the tubes in spaced parallel vertical relationship.

A hydraulic jack assembly 29 for raising and lowering the implement blade includes a cylinder 30 disposed between the brackets 28 and having trunnion arms 31 projecting laterally therefrom intermediate the ends thereof and pivotally supported at 32 on the brackets 28. The cylinder 30 is thus swingably suspended between the brackets. A piston 33 is slidably mounted in the cylinder 30, and a piston rod 34 extends from the piston 33 through the lower end of the cylinder.

Hydraulic fluid conductors 35 and 36 extend respectively from the lower and upper ends of the cylinder 30 to a valve structure V for which a suitable control C is provided for manual operation by the driver in the cab. A pump P driven by the engine of the tractor from a suitable power take-off shaft such as 37 pressures hydraulic fluid through a conductor 38 to the valve structure V for selective flow to either end of the cylinder as desired by the setting of the valve with the control C. A reservoir R is provided on the tractor to supply fluid to the pump through the conductor 38a. The piston 33 is thereby actuated selectively toward either end of the cylinder to raise and lower the piston rod 34.

The implement blade 40 for the bulldozer structure has a transversely curved front face 41 reinforced by upstanding ribs 42 on the back thereof and having a bottom knife edge 43. The blade 40 constitutes the front link of two quadrilateral linkage assemblies designated generally by the reference numerals 44 and 45. The linkage assemblies are alike, and each comprises an upper link 46, a lower link or push beam 47, and an inner link 48. As indicated, the blade 40 forms the common outer link for the linkage assemblies.

The upper links 46 of the linkage assemblies 44 and 45 are pivoted to the upper end of the blade 40 by pins 49 or similar pivots. The forward ends of the push beams or lower links are pivoted to the lower ends of the blade 40 by pivot pins 50 or the like. The rear ends of the upper links 46 are pivoted to the upper ends of the inner links 48 by pins 51 or the like. The lower ends of the inner links 48 are pivoted to brackets 52 on the lower links or push beams 47. These lower links 47 extend rearwardly from the brackets 52 and are fulcrumed on brackets 53 secured to the beams 22 and 23. As illustrated in Figure 2, the push beam links 47 are connected to the blade 40 inwardly from the ends of the blade and brace bars 54 extend from these push beam links 47 outwardly toward the ends of the blade to stiffen the blade and form an additional support therefor. As shown in Figure 4, the same pins 50 which form pivot connections between the lower edge of the blade and the push beam 47 also provide pivot connections between the blade and the forward ends of the brace bars 54.

The push beam links 47 are tied together near their forward ends by means of a cross beam 55. This cross beam 55 connects the push beam links and cross-stabilizes the beams to compel co-movement thereof. The rear face of the cross beam 55 carries spaced brackets 56 receiving therebetween the lower ends of the piston rod 34 of the hydraulic jack assembly 29. A pivot pin 57 pivotally connects the piston rod with the brackets. Raising and lowering of the piston rod therefore raises and lowers the push beam links to selectively vary the level of the blade 40 relative to the tractor.

In order to control the rake angle of the blade 40 as it is raised and lowered, the upper links 46 carry cam rollers 58 on their outer side faces near their rear ends.

The outer faces of the upstanding plates 24 have cams 59 secured thereon as by welding or the like. These cams 59 have outwardly extending side flanges 59a providing tracks receiving the cam rollers 58 therebetween. The cams can have any desired configuration for shifting the rollers 58 forwardly and rearwardly as they are raised and lowered with the linkage quadrilaterals. As the cams shift the rollers forwardly, the upper links of the linkages are shifted forwardly to tilt the upper portion of the blade in a forward direction. Conversely, a rearward shifting of the rollers by the cams will tilt the upper end of the blade rearwardly.

On Figure 3 the full lines illustrate the scraper or blade structure and linkage in an intermediate position within the scraping range. If it is desired to lower the scraper structure, the valve V is set by the control C for flow of hydraulic fluid through the conductor 36 into the upper end of the cylinder 30. Fluid in the top of the cylinder then forces the piston and piston rod downwardly, and this downward movement is transmitted by the cross beam 55 to the push beams or lower links of the linkage quadrilaterals. The lowered position is illustrated by the dotted lines in Figure 3. If it is desired to raise the scraper structure or implement blade, the control C is set so that the valve will direct the pressured fluid into the lower end of the cylinder 30 through the conductor 35 for forcing the piston and piston rod upwardly. This will raise the assembly to the upper dotted line position shown in Figure 3.

When the vehicle is driven forwardly for operation of the scraper structure, the lower links or push beams 47 will function to force the knife end 43 of the blade against the terrain which is to be scraped or operated upon. The upper links 46 and the inner links 48 are then held in position by the cam rollers and cams 59 to position the upper portion of the blade for maintaining the desired tilt or rake angle. The cam track is preferably so designed with an S shape having a rearwardly directed lower end portion, a forwardly directed upper end portion, and a substantially vertical intermediate connecting portion so that the blade will be held in a vertical position throughout a scraping range extending, for example, from a lower level of about twelve inches below the ground line of the tractor to an upper level of about twelve to fourteen inches above the ground line, and to then tilt the upper end of the blade forwardly about 15°. As shown, the cams 59 have their upper ends bowed forwardly and their lower ends bowed rearwardly.

Since the push links or beams 47 are cross-stabilized by the cross beam 55, a single hydraulic jack 29 can be used.

From the above descriptions it will be understood that this invention provides linkage assembly for the implement blade on a vehicle, such as the bulldozer blade on a tractor, to control the rake angle of the blade as it is raised and lowered relative to the vehicle without limitation by fixed pivots or anchor points. The cam control for the rake angle provided by this invention can be varied as desired by simple replacement of cam tracks which are readily accessible and can be, if desired, detachably mounted on the plates 24 and 25. The cams are preferably designed so that they will hold the blade in an unvarying vertical position throughout the normal scraping range.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In combination with a tractor having a main frame, beams on said main frame projecting forwardly therefrom, upstanding plates on the forward ends of said beams, means connecting the upper portions of the plates, a hydraulic jack cylinder pivotally supported on said means in front of said tractor midway between said plates, said cylinder having a piston rod depending therefrom, push beams pivoted on said tractor, a cross beam fixedly connecting said push beams, a pivot connecting the piston rod and cross beam, a blade having its lower portion pivoted on said push beams, upper links pivoted to the upper portion of said blade and extending rearwardly therefrom, inner links pivotally connecting the rear ends of the upper links and the push beams cam tracks on said plates, and cam rollers in said cam tracks mounted on said upper links to shift said links as said jack cylinder raises and lowers said push beams for controlling the rake angle of the blade.

HARRY H. WASHBOND.

REFERENCES CITED

The following references are of record in the file of this patent:

UNITED STATES PATENTS

| Number | Name | Date |
| --- | --- | --- |
| 2,001,803 | Stephens | May 21, 1935 |
| 2,220,267 | Nelson | Nov. 5, 1940 |
| 2,334,374 | Austin | Nov. 16, 1943 |
| 2,404,759 | Washbond | July 23, 1946 |
| 2,404,760 | Washbond | July 23, 1946 |
| 2,450,905 | Mork | Oct. 12, 1948 |